US008035093B2

(12) United States Patent
Brumbaugh et al.

(10) Patent No.: US 8,035,093 B2
(45) Date of Patent: Oct. 11, 2011

(54) MOVABLE MEDIA TRAY WITH POSITION REFERENCE MARKS

(75) Inventors: Donald V. Brumbaugh, Hilton, NY (US); Gary A. Kneezel, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 474 days.

(21) Appl. No.: 12/332,722

(22) Filed: Dec. 11, 2008

(65) Prior Publication Data

US 2010/0150580 A1 Jun. 17, 2010

(51) Int. Cl.
*G01N 21/86* (2006.01)
*B41J 29/393* (2006.01)

(52) U.S. Cl. ........................................ 250/559.4; 347/19

(58) Field of Classification Search ............... 250/559.4, 250/559.44, 559.46, 559.48; 356/616, 617; 358/449; 399/45; 347/19; 271/265.01, 265.02
See application file for complete search history.

(56) References Cited

U.S. PATENT DOCUMENTS 6,380,398 B2 4/2002 Kanstrup et al. .............. 548/530
7,120,272 B2 10/2006 Guiguizian ................... 382/100
7,283,758 B2 * 10/2007 Murakami ...................... 399/45
7,350,902 B2 4/2008 Dietl et al. ...................... 347/43
2002/0135628 A1 9/2002 Kolodziej
2003/0213924 A1 11/2003 Yamaguchi et al.
2006/0187441 A1 8/2006 Sugiyama et al.

FOREIGN PATENT DOCUMENTS

FR 2 786 758 A1 6/2000
WO WO 2005/022127 A2 3/2005

OTHER PUBLICATIONS

U.S. Appl. No. 11/969,277, filed Jan. 4, 2008, Balcan.
U.S. Appl. No. 12/047,359, filed Mar. 13, 2008, Shi et al.
U.S. Appl. No. 12/037,966, filed Feb. 27, 2008, Burke et al.
U.S. Appl. No. 12/037,970, filed Feb. 27, 2008, Burke et al.
U.S. Appl. No. 12/250,717, filed Oct. 14, 2008, Shi et al.

* cited by examiner

*Primary Examiner* — Thanh X Luu
(74) *Attorney, Agent, or Firm* — Stephen H. Shaw; Eugene I. Shkurko

(57) ABSTRACT

A printing system includes a movable tray for holding recording media. The movable tray includes spaced-apart reference marks for determining distance traveled by the tray. A reference-mark optical detector is positioned to provide a field of view through which the reference marks pass. An identifying-mark optical detector provides a field of view through which media-type identifying marks on a piece of recording medium pass. A signal processor provides an output relative to: a) amount of reference marks passing through the field of view of the reference-mark optical detector, and b) signal variation in a signal provided by the identifying-mark optical detector. A look-up table includes media identification signal patterns that are correlated to corresponding media types. Finally, a comparator compares the output of the signal processor to the media identification signal patterns in the look-up table in order to identify type of recording medium.

20 Claims, 11 Drawing Sheets

MOVABLE MEDIA TRAY WITH POSITION REFERENCE MARKS

CROSS REFERENCE TO RELATED APPLICATIONS

Reference is made to commonly assigned, co-pending U.S. Patent Applications:

U.S. patent application Ser. No. 12/332,670, filed herewith, entitled: "MEDIA IDENTIFICATION SYSTEM WITH MOVING OPTOELECTRONIC DEVICE", by T. D. Pawlik et al., the disclosure of which is incorporated herein by reference in its entirety;

U.S. patent application Ser. No. 12/332,648, filed herewith, entitled: "MEDIA IDENTIFICATION SYSTEM WITH SENSOR ARRAY", by T. D. Pawlik et al., the disclosure of which is incorporated herein by reference in its entirety; and U.S. patent application Ser. No. 12/332,616, filed herewith, entitled: "MEDIA MEASUREMENT WITH SENSOR ARRAY", by J. J. Haflinger et al.; the disclosure of which is incorporated herein by reference in its entirety.

FIELD OF THE INVENTION

The present invention relates generally to the field of printers, and in particular, to identifying a type of recording medium that has been loaded into a printer.

BACKGROUND OF THE INVENTION

In order for a printing system (e.g. inkjet, electrophotographic, thermal, etc.) to print high quality images on a recording medium it is important to know what kind of media is about to be printed. In the case of inkjet, for example, preferred recording conditions differ for different type of media, partly because different media interact differently with ink. For instance, ink is able to wick along the paper fibers in plain paper, so that the spot of ink on the paper is enlarged and irregularly shaped relative to the drop of ink that strikes the paper. Media, which are specially formulated for high quality images, such as photographs, typically have one or more ink-receiving layers that absorb the ink in a more controllable fashion, so that the spot size and shape are more regular. Because the colorants are trapped closer to the media surface, and because a larger quantity of ink can be printed, (the associated carrier fluids being absorbed), an image printed on photographic print media has more vibrant colors than the same image printed on plain paper.

The appropriate amount of ink to use for printing an image on one type of media is different than printing on another type of media. If plain paper receives the same quantity of ink, more appropriately deposited in order to print a high-density image such as a photo that would be used for that same image on photographic print media, the plain paper may not be able to dry quickly enough. Even worse, the plain paper may cockle or buckle in the presence of excess ink, so that the printhead crashes into the printed image, thus smearing the image, and also possibly damaging the printhead. Even for two different types or grades of photographic print media, the amount of ink or number of passes to lay down an image for good tradeoffs in printing quality and printing throughput will be different. It is, therefore, important when receiving image-related data on a specific image to be printed, that the specific image be rendered appropriately for a specific media type that the image will be printed on. Image rendering is defined herein as determining data corresponding to: a) the appropriate amount of ink to deposit at particular pixel locations of the image, b) the number of overlapping passes needed to lay the ink down on the media in light of ink-to-ink and ink-to-media interactions, and c) the type of pattern needed to produce the image. In other words, an appropriate print mode is selected according to the media type, and the image is rendered according to that print mode.

Various means are known in the art for providing information to the printer or to an associated host computer regarding the type of media (e.g. glossy media of various grades, matte media of various grades, or plain paper) that is in the input tray of the printer. For example, the user may enter information on media type. Alternatively, there can be a barcode or other type of code pattern printed on the backside of the media that is read by the printer to provide information on media type as a sheet of media is picked from the input tray and fed toward the printing mechanism. Alternatively, media characteristics such as optical reflectance can be used to distinguish among media types. Generally, the processes for automatic media type detection require several seconds to provide accurate media-related information on media type. For competitive printers today, it is important to achieve excellent print quality at fast printing throughput. In particular, a user may be dissatisfied if the time required to print the first page of a print job is excessive.

U.S. Pat. No. 6,830,398 discloses one method providing faster printing throughput while enabling automatic media type detection prior to controlling conditions in the printing operation. In U.S. Pat. No. 6,830,398, a load detector is provided for detecting that recording media has been loaded into the printer. In addition, there is provided a sensor, such as a reflective optical sensor, that can discriminate the type of media type after the media has been loaded in the input but before paper feeding starts. In U.S. Pat. No. 6,830,398, when the printer is turned on, or after media loading has been detected, the sensor obtains information about the media type, even before the first page of media is picked for feeding to print a print job. However, conventional printers do not have a sensor capable of reliably discriminating paper type as described in U.S. Pat. No. 6,830,398. For example, the sensor in U.S. Pat. No. 6,830,398 would have difficulty discriminating between matte paper versus plain paper. To date, it has been found that improved reliability of media type detection is provided when the sensor (such as an optical reflective sensor) provides information regarding a plurality of regions of the recording medium.

U.S. Pat. No. 7,120,272 includes a sensor that makes sequential spatial measurements of a recording medium moving relatively to the sensor, where the recording medium contains repeated indicia to determine a repeat frequency and repeat distance of the indicia. The repeat distance is then compared against known values in a look-up table, for example, to determine the type of recording medium present.

In a carriage printer, such as an inkjet carriage printer, a printhead is mounted in a carriage that is moved back and forth across the region of printing. To print an image on a sheet of paper or other recording medium (also interchangeably referred to as paper or media herein), the recording medium is advanced a given distance along a recording medium advance direction and then stopped. While the recording medium is stopped and supported on a platen in a print zone relative to the printhead carriage, the printhead carriage is moved in a direction that is substantially perpendicular to the recording medium advance direction as marks are controllably made by marking elements on the recording medium, for example, by ejecting drops from an inkjet printhead. After the carriage has printed a swath of the image while traversing the recording medium, the recording medium is advanced, the carriage direction of motion is reversed, and the image is formed swath by swath.

U.S. patent application Ser. Nos. 12/037,970 and 12/250,717, disclose methods for identifying a general type of recording medium (e.g. photo paper versus plain paper) by analyzing a signal from a photosensor that is mounted on the printhead carriage. However, these co-pending patent applications disclose waiting until the recording medium is advanced into the print zone to scan the recording medium with the photosensor. This can increase the time required before the first print is available.

U.S. patent application Ser. No. 12/047,359, incorporated herein by reference in its entirety, discloses a method for identifying a type of recording medium by using identification marks provided on the recording medium, for example on its backside. An embodiment described therein uses the motion of the recording medium as it is being picked from the media input tray in order to move the identification marks past a sensor. In other words, U.S. patent application Ser. No. 12/047,359 discloses waiting until a print job is initiated and recording medium is being picked. This can increase the time required before the first print is available. Special methods for identifying locations of marks are also disclosed in U.S. patent application Ser. No. 12/047,359, in order to compensate for errors in measuring the spacing between marks that are due, for example, to media slippage during advance of the recording medium.

Commonly assigned co-pending U.S. patent application Ser. No. 12/332,670, discloses using an optoelectronic device mounted on the carriage to view a plurality of regions of the media input location as the carriage is moved, and to identify the media type while the media is still in the input location for the media. However, this requires an unobstructed optical path between the optoelectronic device on the carriage and the media input location, and such an unobstructed optical path is not available in all printing systems.

What is needed is a way to reliably identify a type of recording medium at a media input location in a printing system before a print job is initiated.

SUMMARY OF THE INVENTION

The aforementioned need is met, according to the inventive embodiments described herein, by providing a printing system that includes a movable tray for holding recording media. The movable tray includes spaced-apart reference marks for determining distance traveled by the tray. A reference-mark optical detector is positioned to provide a field of view through which the reference marks pass. An identifying-mark optical detector provides a field of view through which media-type identifying marks on a piece of recording medium pass. A signal processor provides an output relative to: a) amount of reference marks passing through the field of view of the reference-mark optical detector, and b) signal variation in a signal provided by the identifying-mark optical detector. A look-up table includes media identification signal patterns that are correlated to corresponding media types. Finally, a comparator compares the output of the signal processor to the media identification signal patterns in the look-up table in order to identify the type of recording medium.

Another aspect of the inventive embodiments provides a method of identifying a type of recording medium that includes a pattern of identifying marks by: a) providing a movable tray assembly including reference marks disposed at a predetermined spacing for measuring distance traveled by the movable tray, b) moving the movable tray assembly, c) detecting the reference marks by an optical detector, d) detecting the pattern of identifying marks on the recording medium, e) processing signals to provide an output corresponding to the reference marks and identifying marks, and f) comparing output of the processed signals to a look-up table including signal output patterns corresponding to a plurality of media types in order to identify the type of recording medium.

DETAILED DESCRIPTION OF THE INVENTION

Figure 1:
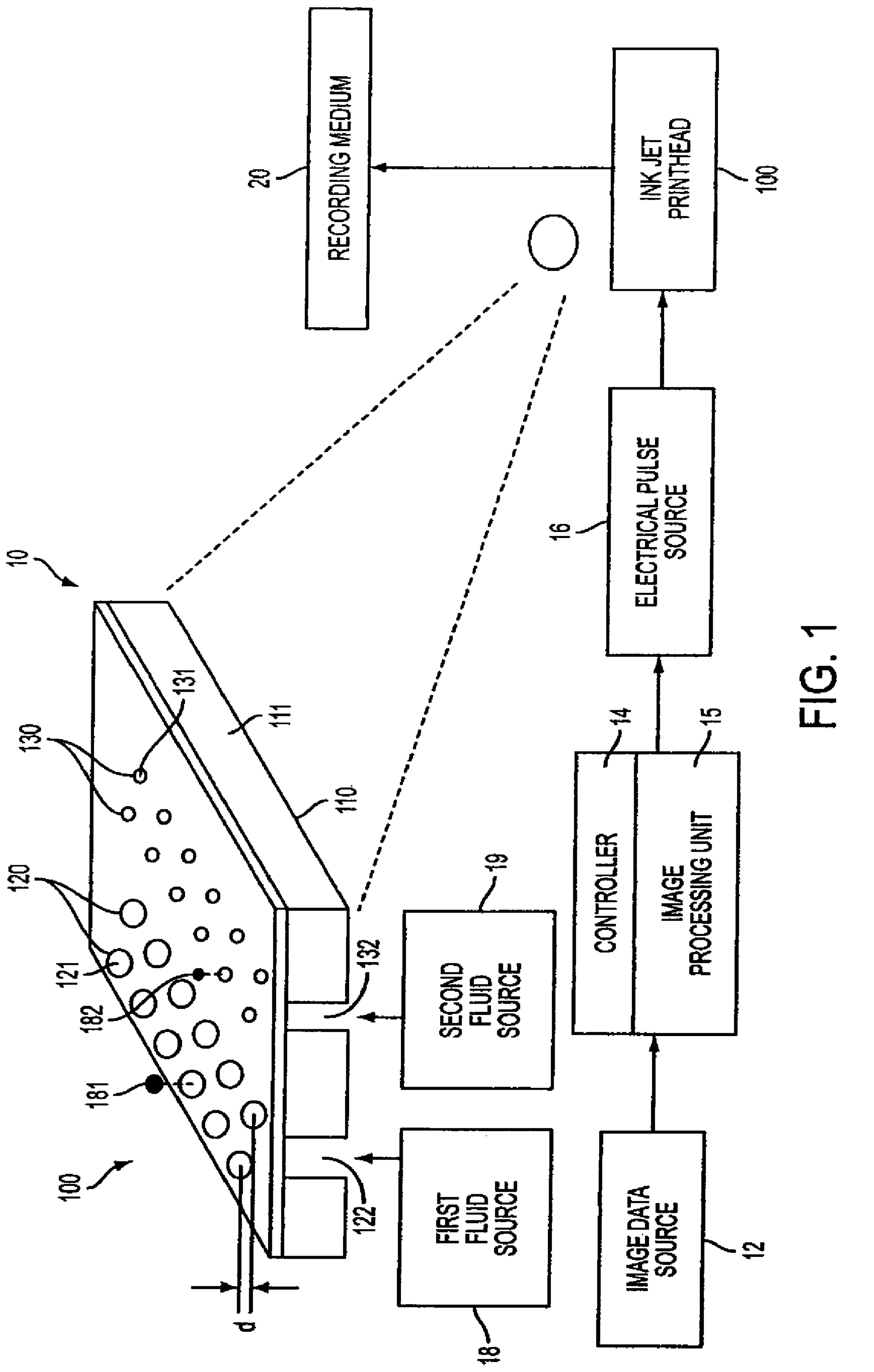
FIG. 1 is a schematic representation of an inkjet printer system.

Referring to FIG. 1, a schematic representation of an inkjet printer system 10 is shown, as described in U.S. Pat. No. 7,350,902, and is incorporated by reference herein in its entirety. Inkjet printer system 10 includes an image data source 12, which provides data signals that are interpreted by a controller 14 as being commands to eject drops. Controller 14 includes an image processing unit 15 for rendering images for printing, and outputs signals to an electrical pulse source 16 of electrical energy pulses that are inputted to an inkjet printhead 100, which includes at least one inkjet printhead die 110.

In the example shown in FIG. 1, there are two nozzle arrays. Nozzles in the first array 121, in the first nozzle array 120, have a larger opening area than nozzles in the second nozzle array 131, in the second nozzle array 130. In this example, each of the nozzles in the first and second nozzle arrays (121 and 131, respectively) has two staggered rows of nozzles, each row having a nozzle density of 600 per inch. The effective nozzle density then in each array is 1200 per inch. If pixels on the recording medium 20 were sequentially numbered along the paper (media) advance direction, the nozzles from one row of an array would print the odd numbered pixels, while the nozzles from the other row of the array would print the even numbered pixels.

In fluid communication with each nozzle array is a corresponding ink delivery pathway. Ink delivery pathway 122 is in fluid communication with first nozzle array 120, and ink delivery pathway 132 is in fluid communication with second nozzle array 130. Portions of ink delivery pathways 122 and 132 (for first and second nozzle arrays, respectively) are shown in FIG. 1 as openings through printhead die substrate 111. One or more inkjet printhead die 110 will be included in inkjet printhead 100, but only one inkjet printhead die 110 is shown in FIG. 1. The inkjet printhead die 110 are arranged on a support member as discussed below, relative to FIG. 2. In FIG. 1, first fluid source 18 supplies ink to first nozzle array 120 via ink delivery pathway 122 (for the first nozzle array), and second fluid source 19 supplies ink to second nozzle array 130 via ink delivery pathway 132 (for the second nozzle array). Although distinct first fluid source 18 and second fluid source 19 are shown, in some applications it may be beneficial to have a single ink source supplying ink to first nozzle array 120 and second nozzle array 130 via ink delivery pathways 122 and 132, for first and second nozzle arrays, respectively. Also, in some embodiments, fewer than two or more than two nozzle arrays may be included on inkjet printhead die 110. In some embodiments, all nozzles on an inkjet printhead die 110 may be the same size, rather than having multiple-sized nozzles on an inkjet printhead die 110.

Not shown in FIG. 1, are the drop-forming mechanisms associated with the nozzles. Drop-forming mechanisms can be of a variety of types, some of which include a heating element to vaporize a portion of ink and thereby cause ejection of a droplet, a piezoelectric transducer to constrict the volume of a fluid chamber and thereby cause ejection of a droplet, or an actuator which is made to move (for example, by heating a bi-layer element) and thereby cause ejection of a droplet. In any case, electrical pulses from electrical pulse source 16 are sent to the various drop ejectors according to the desired deposition pattern. In the example of FIG. 1, droplet (s) ejected from the first nozzle array 181, ejected from first nozzle array 120 are larger than droplet(s) ejected from the second nozzle array 182, ejected from second nozzle array 130, due to the larger nozzle opening area. Typically, other aspects of the drop-forming mechanisms (not shown) associated respectively with first nozzle array 120 and second nozzle array 130 are also sized differently in order to optimize the drop ejection process for the different sized drops. During operation, droplets of ink are deposited on a recording medium 20.

Figure 2:
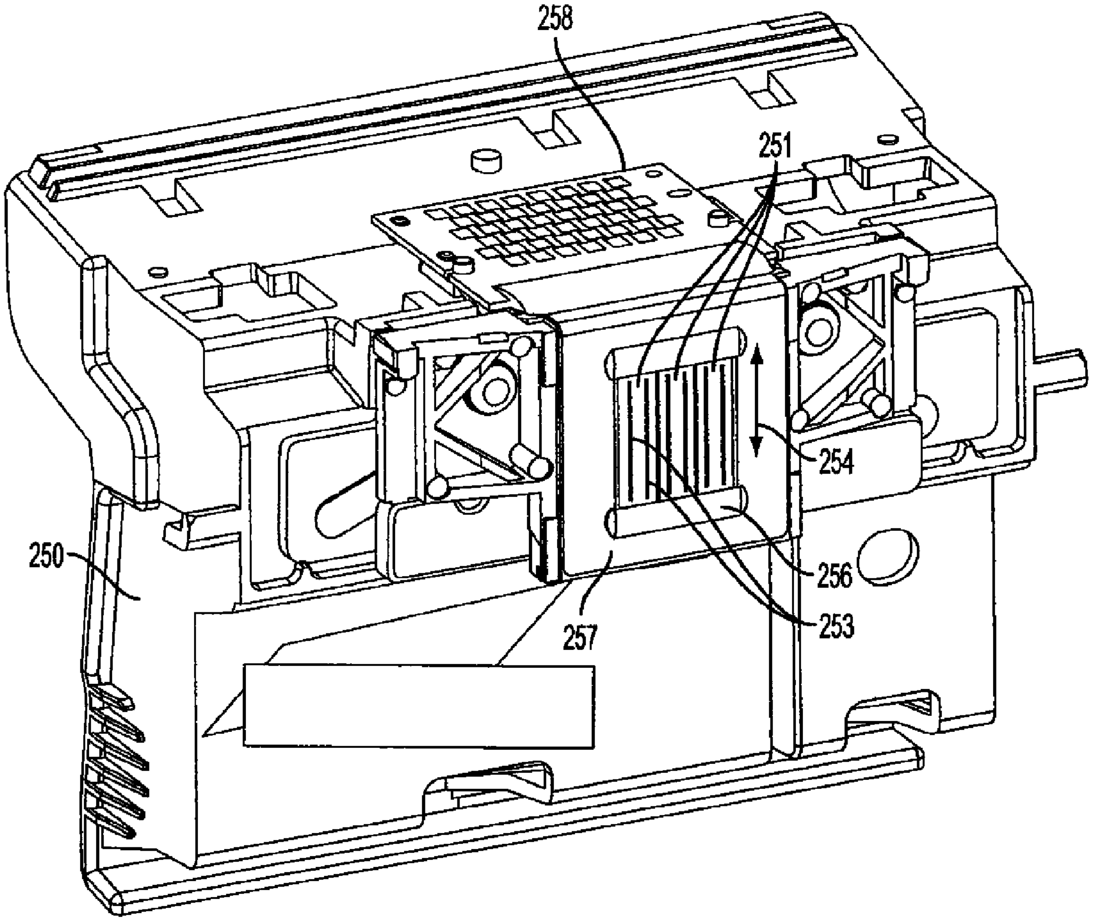
FIG. 2 is a perspective view of a portion of a printhead chassis.

FIG. 2 shows a perspective view of a portion of a printhead chassis 250, which is an example of an inkjet printhead 100. Printhead chassis 250 includes three printhead die 251 (similar to inkjet printhead die 110), each printhead die containing two nozzle arrays 253, so that printhead chassis 250 contains six nozzle arrays 253 altogether. The six nozzle arrays 253, in this example, may be each connected to separate ink sources (not shown in FIG. 2), such as: cyan, magenta, yellow, text black, photo black, and a colorless protective printing fluid. Each of the six nozzle arrays 253 is disposed along nozzle array direction 254, and the length of each nozzle array along nozzle array direction 254 is typically on the order of 1 inch or less. Typical lengths of recording media are 6 inches for photographic prints (4 inches by 6 inches), or 11 inches for paper (8.5 inches by 11 inches). Thus, in order to print the full image, a number of swaths are successively printed while moving printhead chassis 250 across the recording medium 20. Following the printing of a swath, the recording medium is advanced along a media advance direction 304 that is substantially parallel to nozzle array direction 254.

Also shown in FIG. 2 is a flex circuit 257 to which the printhead die 251 are electrically interconnected, for example, by wire bonding or TAB bonding. The interconnections are covered by an encapsulant 256 to protect them. Flex circuit 257 bends around the side of printhead chassis 250 and connects to connector board 258. When printhead chassis 250 is mounted into the carriage 200 (see FIG. 3), connector board 258 is electrically connected to a connector (not shown) on the carriage 200, so that electrical signals may be transmitted to the printhead die 251.

Figure 3:
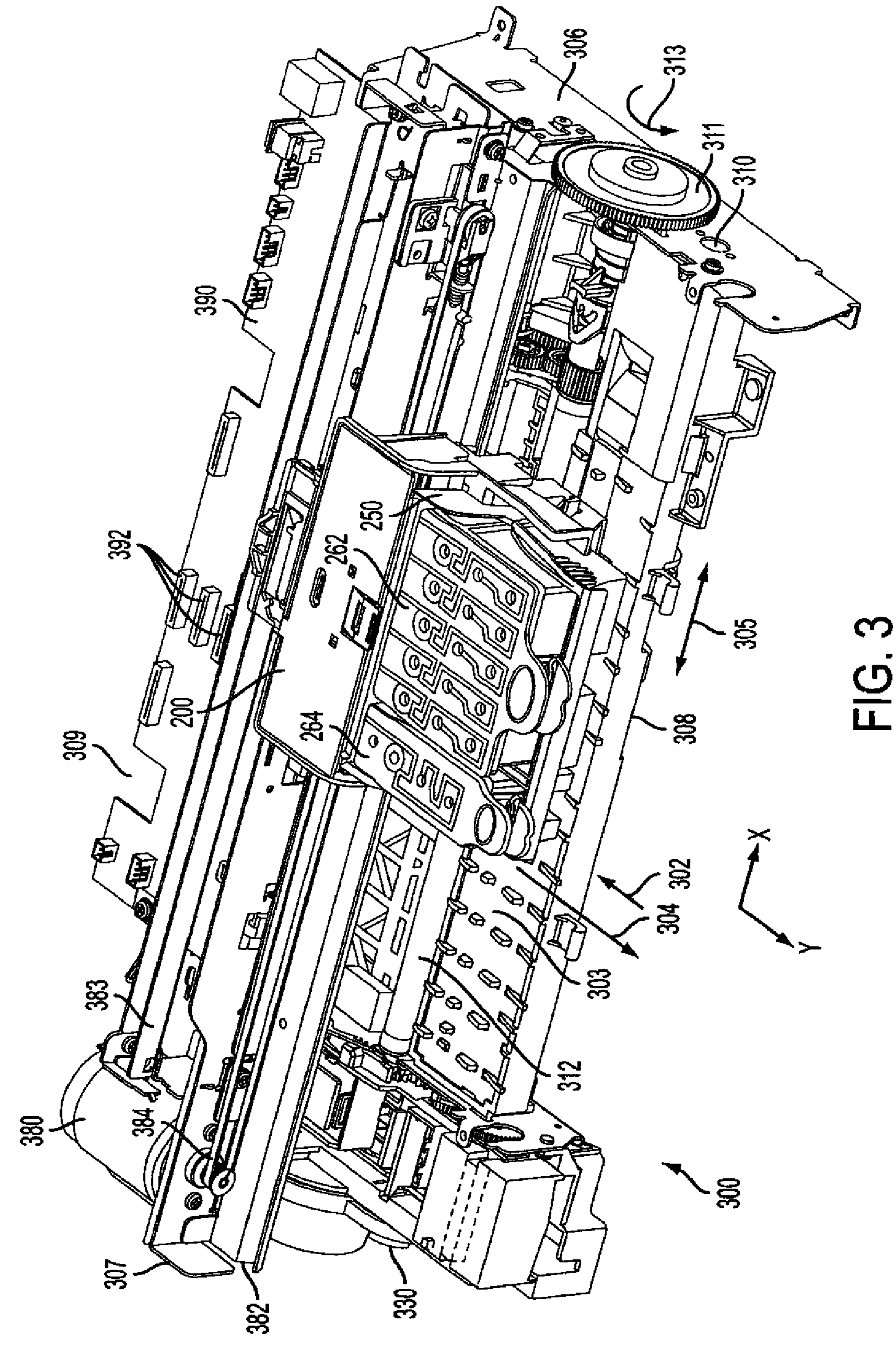
FIG. 3 is a perspective view of a portion of a carriage printer.

FIG. 3 shows a portion of a desktop carriage printer. Some of the parts of the printer have been hidden in the view shown in FIG. 3, so that other parts may be more clearly seen. Printer chassis 300 has a print region 303 across which carriage 200 is moved back and forth in carriage scan direction 305 along the X axis, between the right side of printer chassis 306 and the left side of printer chassis 307 of printer chassis 300, while drops are ejected from printhead die 251 on printhead chassis 250 that is mounted on carriage 200. Carriage motor 380 moves belt 384 to move carriage 200 along carriage guide rail 382. An encoder sensor (not shown) is mounted on carriage 200 and indicates carriage location relative to an encoder fence 383.

Printhead chassis 250 is mounted in carriage 200, multi-chamber ink supply 262, and single-chamber ink supply 264 are both mounted in the printhead chassis 250. The mounting orientation of printhead chassis 250 is rotated relative to the view in FIG. 2, so that the printhead die 251 are located at the bottom side of printhead chassis 250, the droplets of ink being ejected downward onto the recording media in print region 303 in the view of FIG. 3. Multi-chamber ink supply 262, in this example, contains five ink sources: cyan, magenta, yellow, photo black, and a colorless protective fluid; while single-chamber ink supply 264 contains the ink source for text black. Paper or other recording media (sometimes generically referred to as paper herein) is loaded along paper load entry direction 302 toward the front of printer chassis 308 of printer chassis 300.

Figure 4:
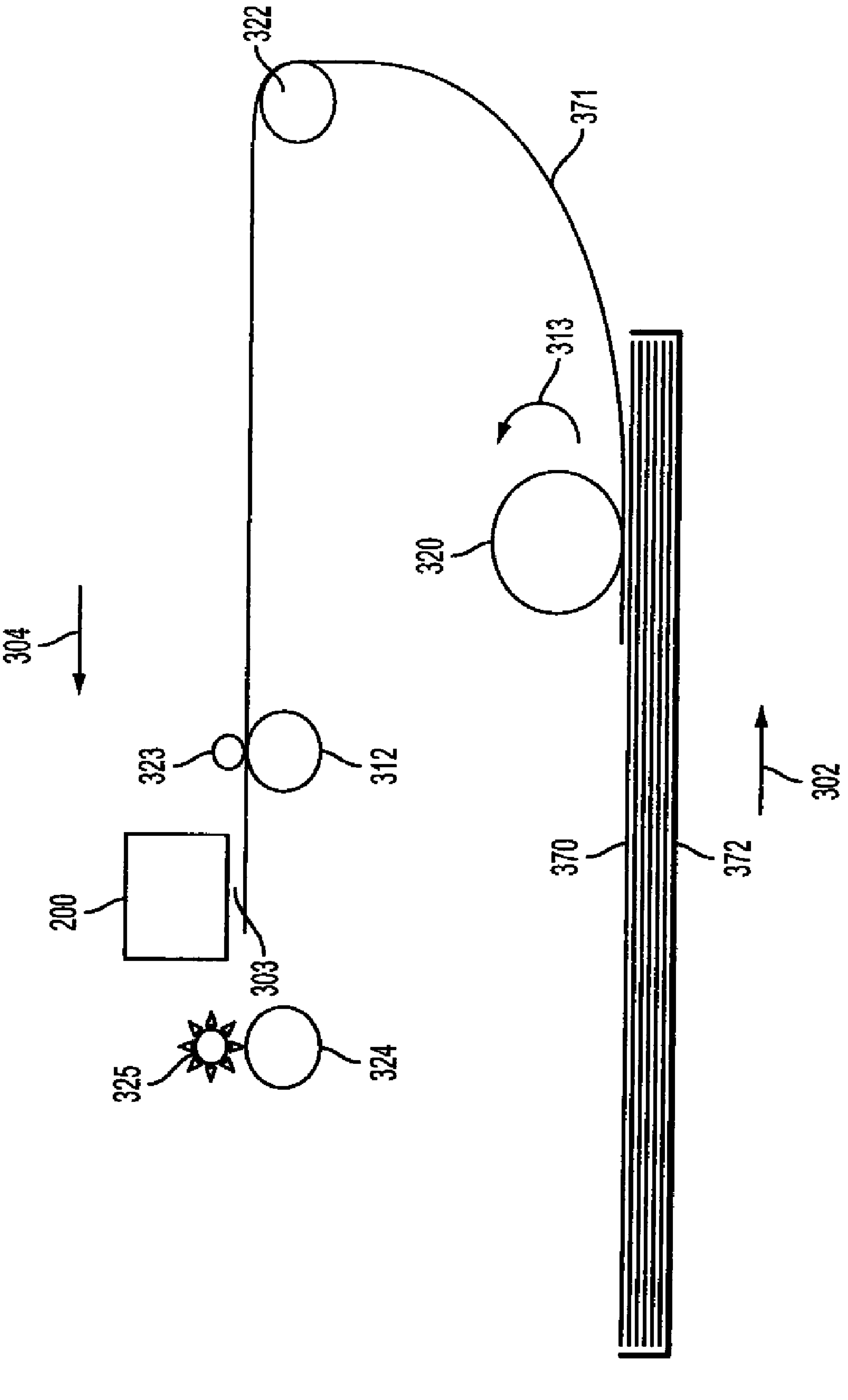
FIG. 4 is a schematic side view of a paper path in a carriage printer.

A variety of rollers are used to advance the medium through the printer, as shown schematically in the side view of FIG. 4. In this example, a pick-up roller 320 moves the top sheet of medium 371 of a stack of media 370 of paper or other recording media (i.e. plural for recording medium) from the media input location in the direction of arrow 302 (paper load entry direction). The media input location can be main media tray 372, for example. A turn roller 322 acts to move the paper around a C-shaped path (in cooperation with a curved rear wall surface, not shown) so that the paper continues to advance along media advance direction 304 from the rear of printer chassis 309 of the printer (also with reference to FIG. 3). The paper is then moved by feed roller 312 and idler roller(s) 323 to advance along the Y axis across print region 303, and from there to a discharge roller 324 and star wheel(s) 325, so that printed paper exits along media advance direction 304. Feed roller 312 includes a feed roller shaft along its axis, and feed roller gear 311 (as in FIG. 3) is mounted on the feed roller shaft. Feed roller 312 can include a separate roller mounted on the feed roller shaft, or can include a thin high friction coating on the feed roller shaft.

The motor that powers the paper advance rollers is not shown in FIG. 1, but the hole 310 at the right side of printer chassis 306 of the printer chassis 300 is where the motor gear (not shown) protrudes through in order to engage feed roller gear 311, as well as the gear for the discharge roller (not shown). For normal paper pick-up and feeding, it is desired that all rollers rotate in forward rotation direction 313. Toward the left side of printer chassis 307, in the example of FIG. 3 is the maintenance station 330.

Toward the rear of printer chassis 309, of the printer in this example, is located the printer electronics board 390, which contains cable connectors 392 for communicating via cables (not shown) to the printhead carriage 200 and from there to the printhead. Also on the printer electronics board 390 are typically mounted motor controllers for the carriage motor 380 and for the paper advance motor, a processor and/or other control electronics (shown schematically as controller 14 and image processing unit 15 in FIG. 1) for controlling the printing process, and an optional connector for a cable to a host computer.

Figure 5:
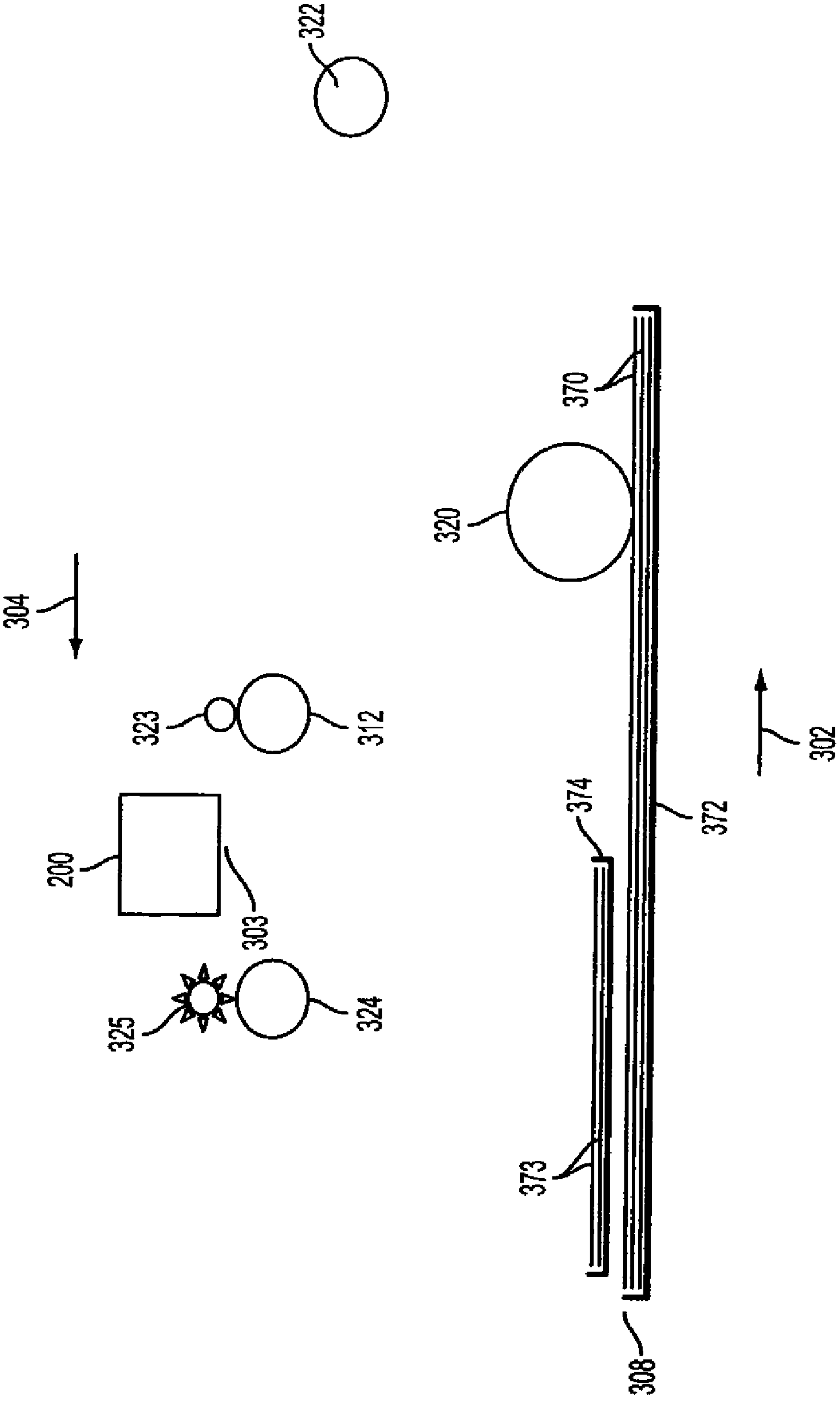
FIG. 5 is a schematic side view of a paper path in a carriage printer including a main media tray and a photo media tray located in a standby position.
Figure 6:
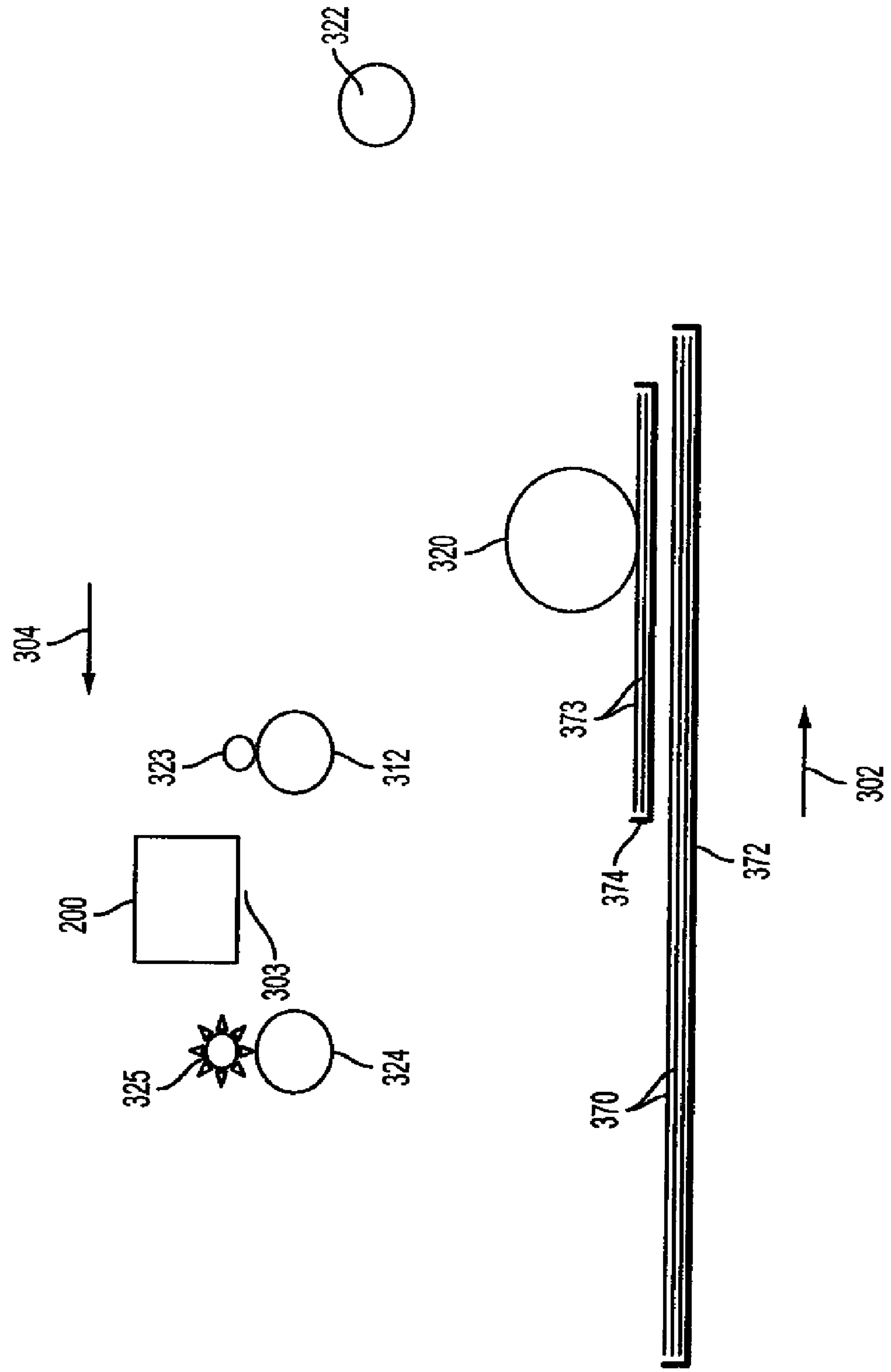
FIG. 6 is a schematic side view of a paper path in a carriage printer including a main media tray and a photo media tray located in a printing position.

In some carriage printers there is both a main media tray 372 for a standard sized sheet of paper, as well as a smaller media tray for holding photo media, as shown, for example, in FIGS. 5 and 6. In both figures there is a stack of media 370 in main media tray 372, and there is a photo media stack 373 in photo media tray 374. In this example, the main media tray 372 is able to hold sheets of media up to a highest stack level. The bottom of photo media tray 374 is configured to be spaced apart from the top sheet of medium in the main media tray 372 when the main media tray 372 is fill, so that that photo media tray 374 can move freely, even when the main media tray 372 is full. The sheets in stack of media 370 are of a larger size (for example, 8.5 inches by 11 inches) compared to the sheets in photo media stack 373 (for example, 4 inches by 6 inches), and photo media tray 374 is not as long as main media tray 372.

In the example shown schematically in FIG. 5, the photo media tray 374 is in a standby position near the front of printer chassis 308 of the printer. With the photo media tray 374 in this position, pick-up roller 320 is able to contact the top sheet in stack of media 370 in the main media tray 372. Also in the standby position of the photo media tray 374, an additional photo media stack 373 can be loaded, while photo media tray 374 is in standby position near the front of printer chassis 308 of the printer. In FIG. 6, the photo media tray 374 has been moved along paper (media) load entry direction 302 to its printing position. When the photo media tray 374 is in the printing position, the pick-up roller 320 is able to contact the top sheet in photo media stack 373. In some printers, power to move the photo media tray 374 back and forth along paper (media) load entry direction 302 is selectively provided by one of the motors of the printer, for example, the motor that also powers the paper advance rollers. In other printers, the photo media tray 374 can be moved back and forth manually along paper (media) load entry direction 302.

For the C-shaped paper path shown in FIGS. 4, 5, and 6, the recording stack of media 370 is loaded backside facing up in main media tray 372 and photo media tray 374. The backside of the media is defined as the side of the sheet that is not intended for printing. Specialty media having glossy, luster, or matte finishes (for example) for different quality media may have identifying marks provided on the backside by the media manufacturer to identify the media type. In addition to information on printing surface finishes, marking code patterns can provide information on recording medium thickness, length, width, orientation, etc.

Unlike examples disclosed in U.S. patent application Ser. No. 12/047,359; where the media manufacturer's markings are detected by a backside media sensor as top sheet of medium 371 is being picked, embodiments of the present application use one or more photosensor assemblies to view regularly spaced reference markings at a predetermined spacing on a moving tray and also to view a spatially varying marking code pattern on a top sheet of (recording) medium 371, to identify the type of recording medium. In some embodiments described herein, the top sheet of (recording) medium 371 can be either in photo media tray 374 or in main media tray 372. The one or more photosensor assemblies provide corresponding time-varying electronic signals which can be interpreted by printer controller 14 as the regularly spaced reference marks and the marking code patterns. By counting the number of signal peaks corresponding to the regularly spaced reference marks that are observed relative to signal variations corresponding to the marking code pattern, for example, the spatial variation of the marking code pattern can be determined and correlated through a look-up table to a particular media type.

Figure 7B:
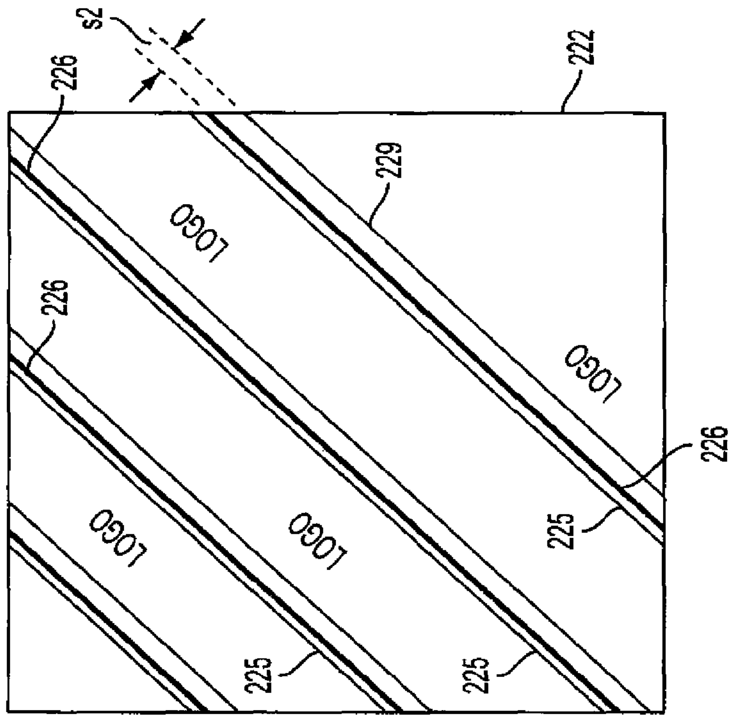
FIGS. 7*a* and 7*b* show schematic representation of markings on the backside of a first type of recording medium and a second type of recording medium respectively.
Figure 7A:
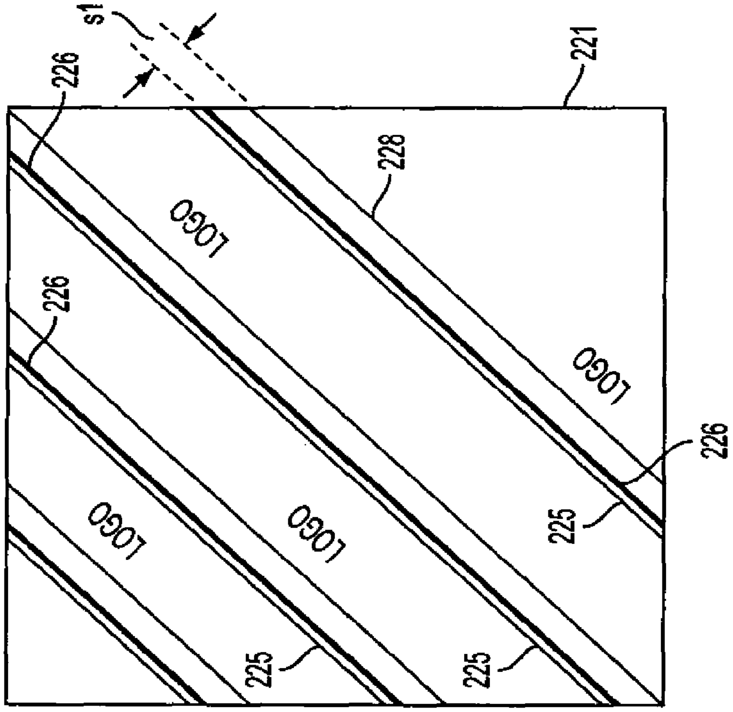

FIGS. 7*a* and 7*b* show schematic representation of markings on the backside of a first type of recording medium and a second type of recording medium, respectively. In this embodiment, each of the various types of recording media has a media reference marking consisting of a pair of "anchor bars" 225 and 226 (first and second bar of anchor bar pairs, respectively), which are located at a fixed distance with respect to one another for all media types. In addition, there is a first identification marks 228 on the first type recording media 221 in FIG. 7*a*, and there is a second identification mark(s) 229 on the second type recording media 222 in FIG. 7*b*. In this example, first identification marks 228 is spaced a distance s1 away from second bar of anchor bar pairs 226 on first type recording media 221, and second identification marks 229 is spaced a distance s2 away from second bar of anchor bar pairs 226 on second type recording media 222, such that s1 does not equal s2. Thus, in this example, it is the spacing of the identification mark (first and second identification marks 228 and 229, respectively) from one of the anchor bars (first and second bar of anchor bar pairs 225 and 226, respectively), that identifies the particular type of recording medium. In other examples, the media code pattern can include identification marks having different widths in order to identify the different media types.

Figure 8:
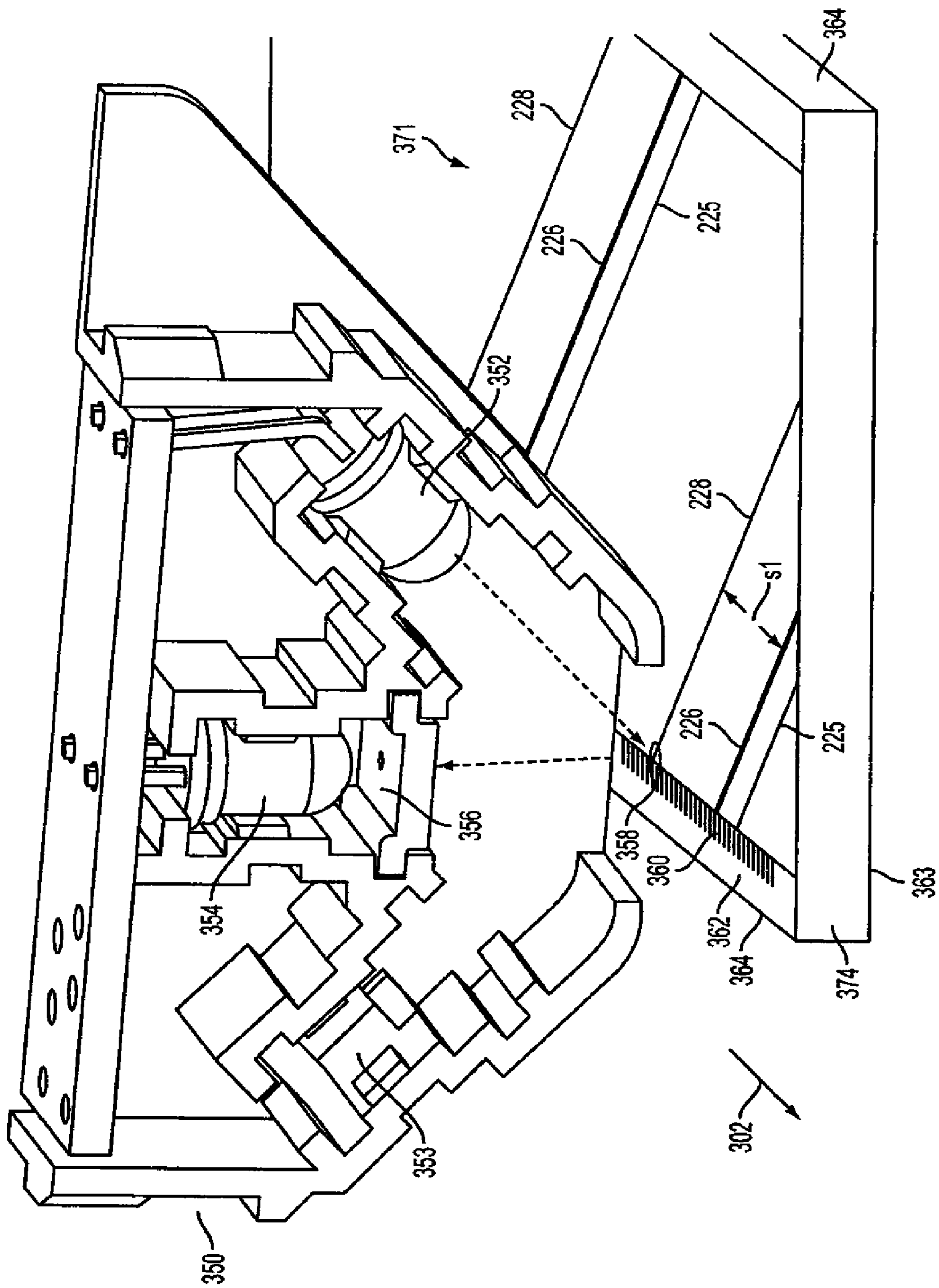
FIG. 8 is a perspective view of an embodiment including a photosensor assembly positioned to view reference marks on a movable tray.

FIG. 8 shows a perspective view of an exemplary embodiment of the present invention, including a photosensor assembly 350 positioned to view reference marks 360 spaced at a predetermined spacing on a movable tray (e.g., photo media tray 374). FIG. 8 is not to scale, and, in particular, photosensor assembly 350 is shown in a magnified view relative to photo media tray 374, for improved clarity. Photosensor assembly 350 includes a light source 352, such as an LED, an optical detector 354, (e.g. a photosensor, such as a photodiode) and an aperture 356. Although the word "light" is used herein, the term is not meant to exclude wavelengths outside the visible spectrum. In some embodiments, the source of light is a near infrared LED, for example.

Photosensor assembly 350 is mounted in stationary fashion above movable photo media tray 374. Light from light source 352 is directed toward an edge portion of the top sheet of medium 371 in photo media tray 374, and also at the reference marks 360, which are arrayed along the adjacent top edge of movable tray 362 of photo media tray 374. Aperture 356 allows a predetermined range of angles of reflected light to reach optical detector 354, thus providing a field of view 358 that includes a region of both the reference marks 360 and the top sheet of medium 371. It is preferred that the size of field of view 358 (along the direction that reference marks 360 are arrayed) is small enough relative to the spacing of the reference marks that only one of the reference marks 360 can be within the field of view 358 of optical detector 354 at any given time, so that signal peaks corresponding to individual reference marks can be more readily distinguished.

In the particular example shown in FIG. 8, the aperture 356 and the optical detector 354 are mounted with their axes parallel to the normal of the photo media tray 374, so that the field of view 358 is approximately the same shape as the aperture 356. Also, the light source 352 is mounted at an angle with respect to the normal, so that the light received by the optical detector 354 has been diffusely reflected from the top sheet of medium 371 and from top edge of movable tray 362 of photo media tray 374. Dashed arrows in FIG. 8 show the light path from light source 352 to the aperture 356. In other embodiments, optical detector 354 and aperture 356 could be alternatively mounted at mounting position 353, so that the light received by optical detector 354 would have been specularly reflected. If the optical detector 354 and the aperture 356 are mounted at a non-normal orientation such as mounting position 353, the field of view 358 will be elongated relative to the actual aperture shape.

In some embodiments, photo media tray 374 is moved manually, and in other embodiments, photo media tray 374 is powered by a motor to move back or forth along paper (media) load entry direction 302 between its standby and its printing locations. As the controller 14 either sends a command to move the photo media tray 374, or it receives a signal that the photo media tray 374 is moving, it can also send a command to the power supply for light source 352 to turn on light source 352 so that it emits light. Optical detector 354 receives light reflected from the top sheet of medium 371 and the reference marks 360 to provide an electronic signal that is sent to a signal processor in controller 14. The optical detector 354 signal is larger when more light is received, so that as tray reference marks 360 and media code patterns (e.g. first and second bar of anchor bar pairs 225 and 226, respectively, and first identification marks 228) enter or leave the field of view 358, a time-varying electronic signal is provided by optical detector 354.

Figures 9A, 9B, 9C:
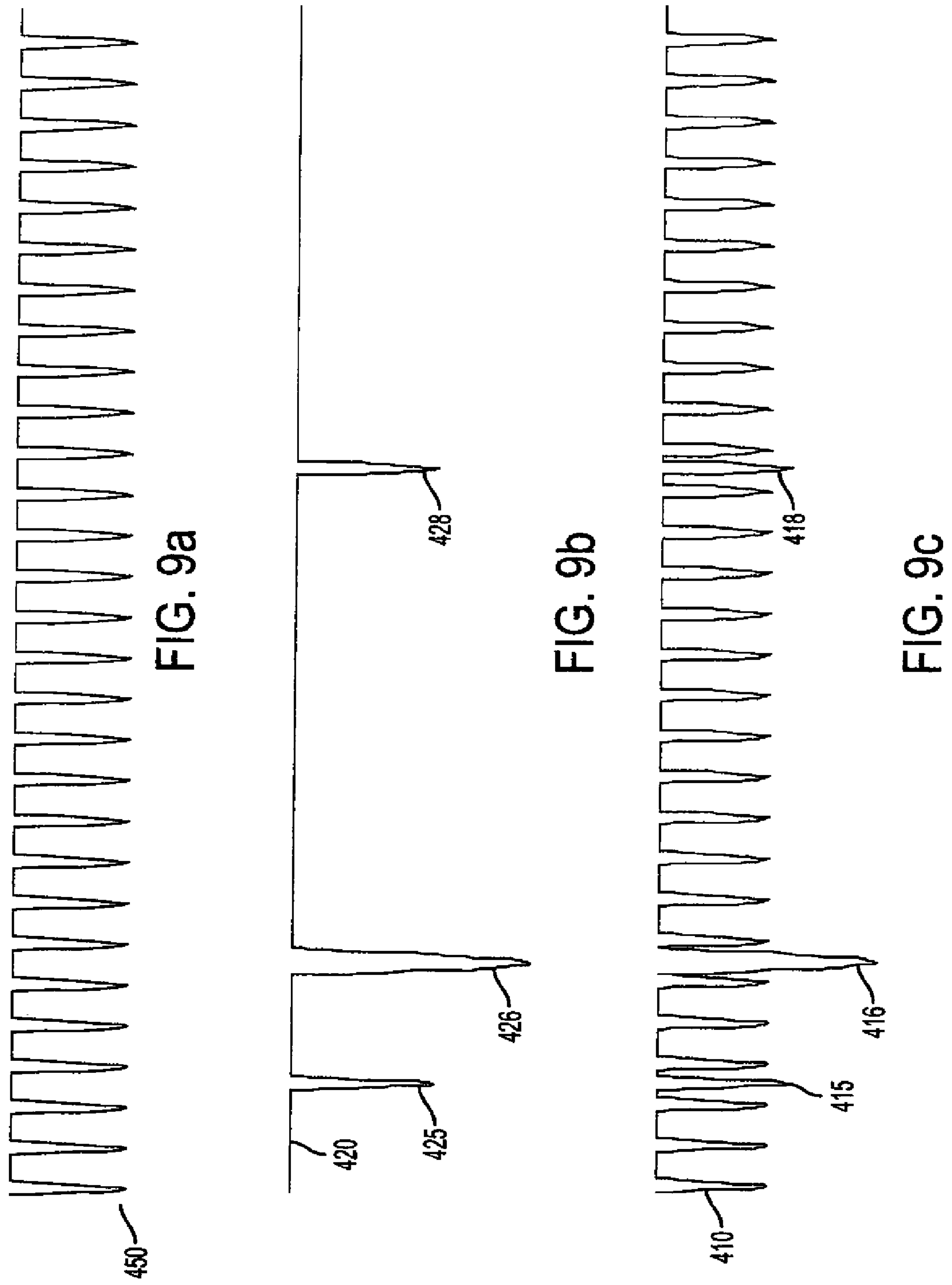
FIGS. 9*a*, 9*b*, and 9*c* are schematic representations of signals from an optical detector viewing reference marks and media marking codes.

The amplitude of the electronic signal at a given time depends upon whether the media code pattern markings (first and second bar of anchor bar pairs 225 and 226, respectively, and first identification marks 228) absorb more or less light than the unmarked regions of the backside media surface, whether the reference marks 360 absorb more or less light than the unmarked regions of top edge of movable tray 362, the widths of the various markings, and what is in the field of view 358 at that given time. FIG. 9*a* schematically shows a time-varying output signal 450 from optical detector 354 corresponding only to the reference marks 360 in FIG. 8. This would be the signal, for example, for a piece of white medium having no media code pattern markings on its backside, at least in the region corresponding to the signal in FIG. 9*a*. Reference marks 360 in FIG. 9*a* consist of narrow black lines on a white background. When no black reference mark is in the field of view 358, the signal from optical detector 354 is at a high background level. As photo media tray 374 is moved along paper (media) load entry direction 302, the narrow black lines of reference marks 360 enter and leave the field of view 358. As the black lines enter field of view 358, the signal from the optical detector 354, decreases. When a black line is fully in the field of view 358 of the optical detector 354, the photosensor signal is at a relative low point. (Note: Subsequent signal processing in the signal processor in controller 14 can result in such low points being peaks rather than valleys in the signal, and extremes in the signal level will generally be referred to as peaks herein.) As the black line leaves the field of view 358 of optical detector 354, the signal returns to its background level. Signal 450 has twenty-nine low points (also called peaks), corresponding to twenty-nine black lines of reference marks 360 entering and leaving the field of view 358 and photo media tray 374 is moved along paper (media) load entry direction 302. Knowing the spacing between black lines and counting the corresponding signal peaks provides a measurement of distance traveled by the movable photo media tray 374.

FIG. 9*b* schematically shows a time-varying signal 420 from optical detector 354 corresponding to only the backside of the top sheet of medium 371, as shown in FIG. 8, assuming the media code patterns (first and second bar of anchor bar pairs 225 and 226, respectively, and first identification marks 228) are formed using a light absorbing material (e.g. an absorbing material for near infrared light). Signal 420 would occur if the field of view 358 only passes over the backside of top sheet of medium 371, and not reference marks 360. The high background level corresponds to white regions of the backside of the top sheet of medium 371. Peak 425 corresponds to narrow, first bar of anchor bar pairs 225, entering and leaving field of view 358. Peak 426 corresponds to wider second bar of anchor bar pairs 226 entering and leaving field of view 358. Peak 428 corresponds to first identification marks 228 entering and leaving field of view 358.

FIG. 9*c* schematically shows a time-varying signal 410 from optical detector 354 corresponding to both the reference marks 360 and also the media code patterns (first and second bar of anchor bar pairs 225 and 226, respectively, and first identification marks 228), passing through the field of view 358, assuming the media code patterns (first and second bar of anchor bar pairs 225 and 226, respectively, and first identification marks 228), are formed using a light absorbing material and the reference marks 360 are narrow dark (light absorbing) lines on a light (light reflecting) background. Time varying signal 410 is essentially a summation of the signals 450 and 420 shown in FIGS. 9*a* and 9*b*. Signal 410 is optionally amplified and sent to an analog to digital converter to provide digitized data representing signal 410. The digitized data is further processed by the signal processor in controller 14 to identify media code pattern signal peaks 415 (corresponding to first bar of anchor bar pairs 225), 416 (corresponding to second bar of anchor bar pairs 226) and 418 (corresponding to first identification marks 228). The number of reference mark peaks between peak 415 and peak 416 is counted (e.g. three peaks in FIG. 9*c*) by the signal processor in controller 14 and compared to a look-up table in controller 14 to demonstrate that these are the anchor bar peaks. The fact that peak 416 is larger and broader than peak 415 indicates that peak 416 corresponds to the wider, second bar of anchor bar pairs 226. Then, the number of reference mark signal peaks between media code pattern peak 416 and media code pattern peak 418 is counted (e.g. twelve reference mark signal peaks in FIG. 9*c*) to provide a measurement of s1, relative to the number and spacing of reference marks 360. This measurement of s1 (or equivalently, the number of reference mark signal peaks between media code pattern peaks 416 and 418) is then compared to a look-up table of media type and corresponding media identification signal patterns to identify the particular media type. The look-up table can be in controller 14, and a comparator in controller 14 can be used to compare the signal patterns corresponding to the media code pattern on the top sheet of (recording) medium 371 to the media identification signal patterns stored in the look-up table.

In the example described with reference to FIGS. 9*a*, 9*b*, and 9*c*, signal 410 is somewhat complex. In fact, it can be even more complex than is shown in the figure, because peaks 425, 426, and 428 can line up in various places relative to the peaks corresponding to reference marks 360, depending on how the media code patterns are located on the top sheet of medium 371. However, the pattern of background signal 450 is regular if the photo media tray 374 is moved at uniform velocity. For the case of a movable tray powered by a motor, it can be possible to identify a series of peaks corresponding to reference marks 360, and subtracting out digital values corresponding to signal 450 from the digitized data corresponding to signal 410.

Figure 10A:
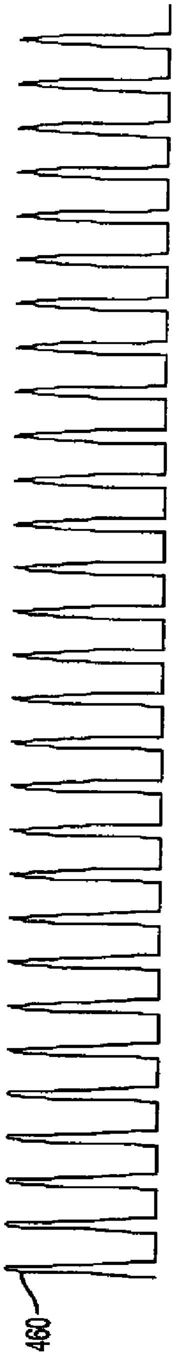
FIGS. 10*a*, 10*b*, and 10*c* are schematic representations of signals from an optical detector viewing reference marks and media marking codes.
Figure 10B:
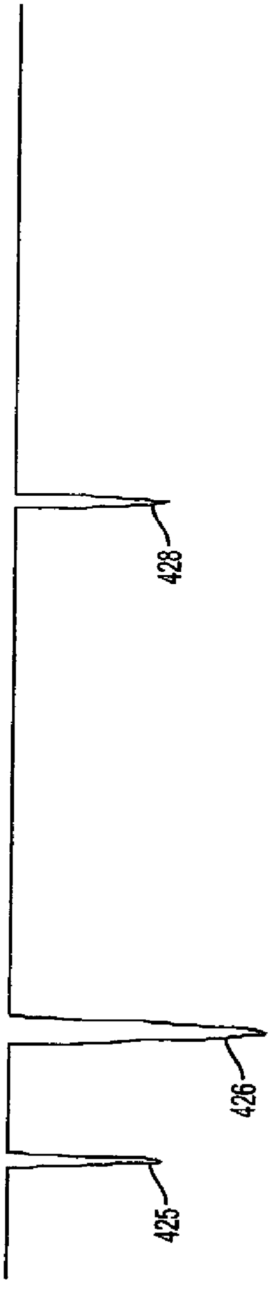
Figure 10C:
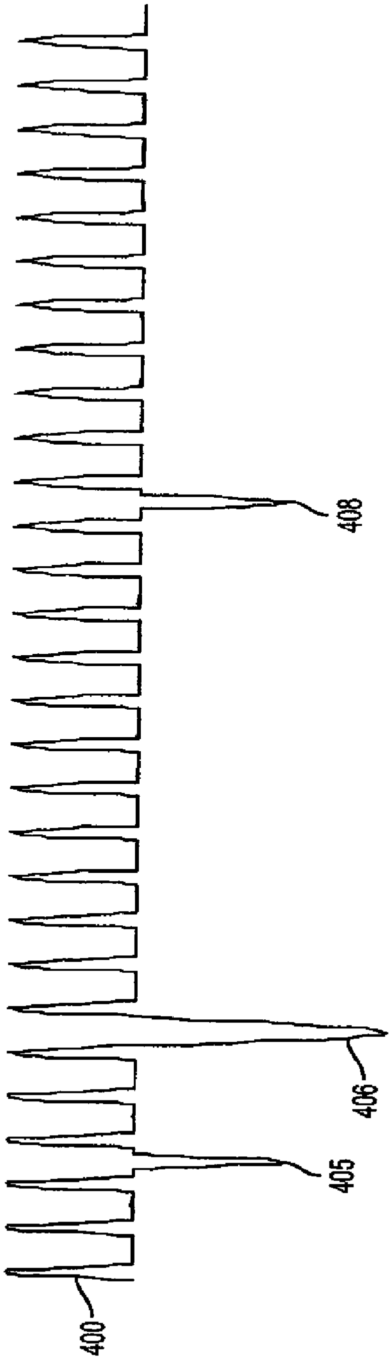

An alternative way of clarifying which peaks correspond to reference marks 360 and which peaks correspond to media code patterns is shown in FIGS. 10*a*, 10*b*, and 10*c*. In this example, rather than having the reference marks 360 consist of narrow dark (light absorbing) lines on a light (light reflecting) background. The reference marks relative to signal 460 in FIG. 10*a* consist of narrow light lines on a dark background. When the field of view 358 includes only the dark portion of the top edge of movable tray 362 of photo media tray 374, the signal 460 is at a relative low background level. As light lines go in and out of the field of view 358, the signal 460 from optical detector 354 increases from the low background level. As a result, the peaks in signal 460 of FIG. 10*a* are of the opposite sense from the peaks in signal 450 of FIG. 9*a*. If the media code patterns are formed, using light-absorbing material, as in the example relative to FIG. 10*b*, the resultant signal 400 in FIG. 10*c* corresponding to both the reference marks and the media code pattern has peaks that extend in opposite directions from the reference pattern, which can be more readily disentangled by the signal processor in controller 14. In particular, since peak 425 (corresponding to narrow, first bar of anchor bar pairs 225), peak 426 (corresponding to wide, second bar of anchor bar pairs 226) and peak 428 (corresponding to first identification marks 228) of FIG. 10*b* extend in opposite directions from the peaks in signal 460 of FIG. 10*a*, the resultant media code pattern peaks 405, 406, and 408 respectively in FIG. 10*c* are more readily discerned from the reference mark signals.

Similarly, if the media code patterns are formed using a fluorescing material, such that the intensity of light corresponding to the media code patterns is greater than the light reflected from the non-marked region of the backside of the medium, reference marks consisting of narrow dark lines on a light background, can also provide signal peaks of opposite sense for reference marks and media code marks.

In other embodiments, two different optical detectors are used; one optical detector to provide a field of view including reference marks 360, and the other optical detector to provide a field of view 358 including the media code patterns on the backside of the top sheet of medium 371. The signal data from both optical detectors can be synchronized in time using a clock signal from a clock in controller 14, so that whether the movable tray is motorized or moved manually, the number of reference lines between bars of a media code pattern can be readily determined. Such embodiments are equivalent to having a linear encoder arrayed along paper (media) load entry direction 302 of photo media tray 374. The encoder lines can be along top edge of movable tray 362, as they are in FIG. 8. Alternatively they can be along a side edge of movable tray 364 (inside or outside the tray) or a bottom edge of movable tray 363, as long as an optical detector is positioned to provide a field of view 358 that the lines go into and out of as the tray is moved. The reference marks 360 can be provided by forming them directly along an edge of the tray, or they can be provided by attaching a linear encoder strip to the edge of the tray, for example.

An advantage of having two different optical detectors is that it can be easier to keep both the reference marks 360 and the media code patterns on the backside of the top sheet of medium 371 sufficiently in focus as the media stack height varies from the tray being full (as it is in FIG. 8) to being empty. For example, the optical detector 354 corresponding to the reference marks 360 can be stationarily mounted a given distance from the plane of the reference marks 360; while the optical detector 354 corresponding to the media in the tray, can be spring loaded, pivotally-mounted, weighted, or otherwise constrained to be in contact with or at a predetermined spacing (set by one or more spacers) from the backside of top sheet of medium 371.

Figure 11:
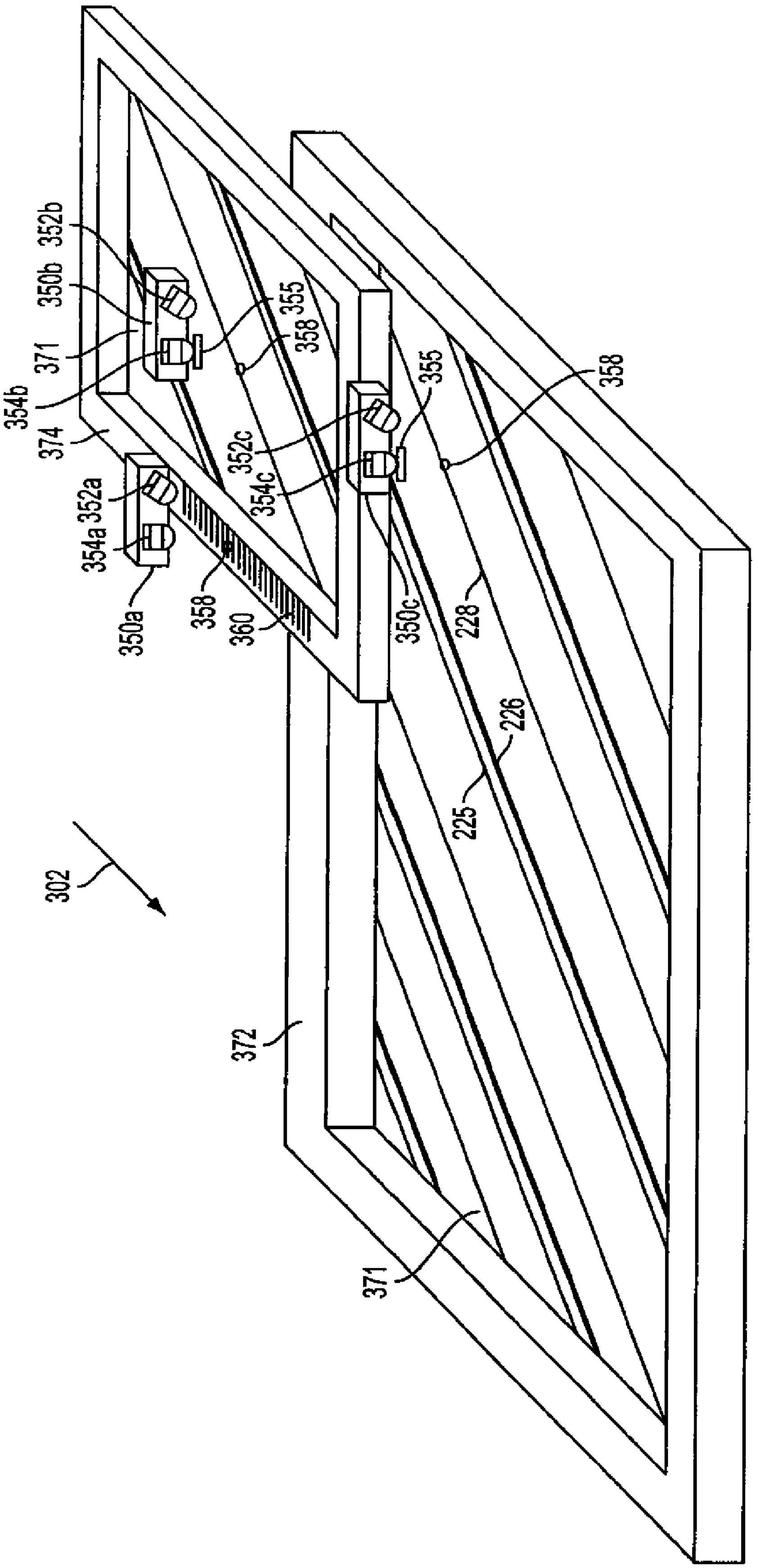
FIG. 11 is a perspective view of an embodiment including a photosensor assembly positioned to view reference marks on a movable tray, as well as photosensor assemblies positioned to view media code markings.

In the embodiments described above, the optical detector (s) 354 viewed the backside of the top sheet of medium 371 in the movable tray (e.g. photo media tray 374) and also viewed the reference marks 360 on the edge of the movable tray. This enables identifying the type of media in the movable tray. FIG. 11 shows an embodiment capable of identifying the types of media in both the movable tray (e.g. photo media tray 374) and an adjacent stationary tray (e.g. main media tray 372). In the embodiment shown in FIG. 11, the two photosensor assemblies 350*a* and 350*b* view the reference marks 360 and the backside of the top sheet of medium 371 in the photo media tray 374, respectively. Each of the photosensor assemblies 350*a* and 350*b* includes a light source (LED) 352*a* and 352*b* and an optical detectors 354*a* and 354*b*. The optical detectors 354*a* and 354*b* have fields of view 358 on the reference marks 360 and on the backside of top sheet of medium 371, respectively. Optionally in this embodiment, the two photosensor assemblies 350*a* and 350*b* could be replaced by a single photosensor assembly 350 having a field of view 358 including both the reference marks 360 and the backside of the top sheet of medium 371 in the photo media tray 374, as described above with reference to FIG. 8. In FIG. 11 an optical component 355 is shown between the optical detector 354*b* and its field of view 358 on top sheet of medium 371. Optical component 355 can include a lens or an aperture, for example, and is designed to provide sufficient depth of field such that the media code markings (not labeled for improved clarity) on top sheet of medium 371 in photo media tray 374 remain sufficiently in focus as the media stack height in photo media tray 374 ranges from full to nearly empty.

In order to identify the type of media in the stationary main media tray 372, the embodiment shown in FIG. 11 also includes a tray-mounted photosensor assembly 350*c* that is mounted on the movable photo media tray 374. Tray-mounted photosensor assembly 350*c* includes a light source 352*c* and an optical detector 354*c*. An optical component 355 is shown between the optical detector 354*c* and its field of view 358 on top sheet of medium 371 in main media tray 372. Optical component 355 can include a lens or an aperture, for example, and is designed to provide sufficient depth of field such that the media code markings (first and second of anchor bar pairs 225 and 226, respectively, and first identification marks 228), on top sheet of medium 371 remain sufficiently in focus as the media stack height in main media tray 372 ranges from full to nearly empty. As photo media tray 374 is moved back and forth along paper (media) load entry direction 302, reference marks 360 enter and leave the field of view 358 of optical detector 354*a*. The corresponding signal from optical detector 354*a* is synchronized using a clock signal from a clock in controller 14 with a signal from optical detector 354*c* in tray-mounted photosensor assembly 350*c* corresponding to media code markings (first and second of anchor bar pairs 225 and 226, respectively, and first identification marks 228), that go in and out of its field of view 358 as the tray-mounted photosensor assembly 350*c* is moved together with photo media tray 374. The spacing between media code markings on top sheet of medium 371 in stationary main media tray 372 is thus measured with respect to reference marks 360 on moving photo media tray 374 by counting reference mark signal peaks from optical detector 354*a* that occur in time between media code marking signal peaks from optical detector 354*c* in tray-mounted photosensor 350*c*. The signal pattern corresponding to the spatial variation of media code markings on top sheet of medium 371 can be compared to media identification signal patterns stored in a look-up table in controller 14 in order to identify the type of media in main media tray 372.

In general, whether the media code marking pattern includes identifying marks of predetermined spacing, widths, or other spatial variation, the signal processor in controller 14 provides an output relative to: a) the amount of reference marks 360 passing through the field of view 358 of the reference mark optical detector 354*a* as the movable tray moves; and b) the signal variation in a signal provided by the identifying-mark optical detector 354*b* as the movable tray moves. The amount of reference marks 360 passing through the field of view 358 can be an integer number of reference marks 360 or can be an integer number of marks plus a fraction of spacings between peaks corresponding to reference marks 360, in order to use the time-varying signal from an optical detector to provide a measurement of the spatially varying media code pattern on a piece of recording medium that can either be in the movable tray or in an adjacent stationary tray. The output of the signal processor in controller 14 is then compared to media identification signal patterns in the look-up table in controller 14 in order to identify the type of recording medium.

Once the type of recording medium has been identified, the print driver can select a print mode so that the image can be rendered appropriately by image processing unit 15 for that media type, i.e. with an appropriate number of multiple passes for printing, an appropriate amount of ink to lay down, and appropriate patterns of ink to lay down.

For embodiments where the movable tray is motorized, controller 14 can send commands for moving the movable tray and for initiating the media identification process for media in one or more trays at a point in time when media is not being picked from the movable tray. This point in time can be between printing successive sheets from the movable tray, or after a possible media load event (detected by a user-initiated command to move the tray), or when the printer is turned on, for example.

In the embodiments described above, the reference marks that are used to determine the distance traveled by the movable tray are arrayed in linear fashion along an edge of the movable tray. However, it is also contemplated to monitor the distance traveled by a movable tray assembly using a rotary encoder (not shown, but can be mounted co-axially with feed roller gear 311, with reference to FIG. 3, for example) having reference marks disposed at a predetermined angular spacing to measure an amount of rotation of the motor that provides the power for moving the movable tray. Even though the rotary encoder in such an embodiment may have been primarily intended for other uses in the printing system, such as monitoring the amount of media feeding, for the purpose of this invention, the movable tray assembly is considered to include said rotary encoder.

In general, if it is known that the media types of interest have media code patterns with a repeat distance D, it is preferable for the movable tray to move at least a distance of 2D, in order to make sure that at least one full code pattern passes the field of view of the optical detector, no matter what the starting position of the code pattern relative to a lead edge or trailing edge of the recording medium. The reference marks (or linear encoder strip) should also therefore extend a distance of at least 2D along the movable tray.

The invention has been described in detail with particular reference to certain preferred embodiments thereof, but it will be understood that variations and modifications can be effected within the spirit and scope of the invention.

PARTS LIST

10 Inkjet printer system
12 Image data source
14 Controller
15 Image processing unit
16 Electrical pulse source
18 First fluid source
19 Second fluid source
20 Recording medium
100 Inkjet printhead
110 Inkjet printhead die
111 Printhead due substrate
120 First nozzle array
121 Nozzles in first nozzle array
122 Ink delivery pathway (for first nozzle array)
130 Second nozzle array
131 Nozzles in second nozzle array
132 Ink delivery pathway (for second nozzle array)
181 Droplet(s) ejected from first nozzle array
182 Droplet(s) ejected from second nozzle array
200 Carriage
221 First type recording medium (first media type)
222 Second type recording medium (second media type)
225 First bar of anchor bar pairs
226 Second bar of anchor bar pairs
228 First identification marks (for first type recording medium)
229 Second identification marks (for second type recording medium)
250 Printhead chassis
251 Printhead die
253 Nozzle array(s)
254 Nozzle array direction
256 Encapsulant
257 Flex circuit
258 Connector board
262 Multi-chamber ink supply
264 Single-chamber ink supply
300 Printer chassis
302 Paper (media) load entry direction
303 Print region
304 Media advance direction
305 Carriage scan direction
306 Right side of printer chassis
307 Left side of printer chassis
308 Front of printer chassis
309 Rear of printer chassis
310 Hole (for paper advance motor drive gear)
311 Feed roller gear
312 Feed roller
313 Forward rotation direction
320 Pick-up roller
322 Turn roller
323 Idler roller(s)
324 Discharge roller
325 Star wheel(s)
330 Maintenance station
350 Photosensor assembly
350*a* Photosensor assembly
350*b* Photosensor assembly
350*c* Photosensor assembly

352 Light source
352*a* Light source
352*b* Light source
352*c* Light source
353 Mounting position
354 Optical detector
354*a* Optical detector
354*b* Optical detector
354*c* Optical detector
355 Optical component
356 Aperture
358 Field of view
360 Reference marks
362 Top edge of movable tray
363 Bottom edge of movable tray
364 Side edge of movable tray
370 Stack of media
371 Top sheet of medium
372 Main media tray
373 Photo media stack
374 Photo media tray
380 Carriage motor
382 Carriage guide rail
383 Encoder fence
384 Belt
390 Printer electronics board
392 Cable connectors
400 Signal
405 Peak
406 Peak
408 Peak
410 Signal
415 Peak
416 Peak
418 Peak
420 Signal
425 Peak
426 Peak
428 Peak
450 Signal
460 Signal

The invention claimed is:

1. A printing system comprising:

a movable tray for holding recording media, wherein the movable tray includes reference marks provided at a predetermined spacing for determining a distance traveled by the movable tray;

a reference-mark optical detector positioned to provide a field of view through which the reference marks pass as a result of motion of the movable tray;

an identifying-mark optical detector positioned to provide a field of view through which media-type identifying marks on a piece of recording medium pass as a result of motion of the movable tray;

a signal processor to provide an output relative to: a) the amount of reference marks passing through the field of view of the reference-mark optical detector as the movable tray moves, and b) the signal variation in a signal provided by the identifying-mark optical detector as the movable tray moves;

a look-up table including a plurality of media identification signal patterns that are correlated to corresponding media types; and a comparator that compares the output of the signal processor to the plurality of media identification signal patterns in the look-up table in order to identify type of recording medium.

2. The printing system claimed in claim 1, further comprising a motor mechanically linked to the movable tray to cause movement of the movable tray.

3. The printing system claimed in claim 1, wherein the reference-mark optical detector is the same optical detector as the identifying-mark optical detector, and wherein the field of view of said optical detector overlaps:

a) a portion of the reference marks; and b) a location within the movable tray.

4. The printing system claimed in claim 1, wherein the field of view of the identifying-mark optical detector includes a location within the movable tray.

5. The printing system claimed in claim 1, the printing system further comprising a stationary tray for holding recording medium.

6. The printing system claimed in claim 5, wherein the identifying-mark optical detector is mounted on the movable tray, and wherein the field of view of the identifying-mark optical detector includes a location within the stationary tray.

7. The printing system claimed in claim 1, the printing system further comprising a print driver that selects a print mode according to the recording medium type identified by the comparator.

8. The printing system claimed in claim 1, wherein the source of light is a light emitting diode.

9. The printing system claimed in claim 8, wherein the light emitting diode is a near-infrared light emitting diode.

10. The printing system claimed in claim 1, wherein the reference marks include light reflecting lines on a light absorbing background.

11. The printing system claimed in claim 1, wherein the reference marks are provided by an encoder strip attached to the movable tray.

12. The printing system claimed in claim 1, wherein the identifying-mark optical detector is included in a photosensor assembly, and wherein the photosensor assembly is constrained to be in contact with or at a predetermined spacing from a top sheet of recording medium.

13. The printing system claimed in claim 1, further comprising an optical element positioned between the identifying-mark optical detector and the location for media-identifying marks, wherein the optical element provides a depth of field such that media-identifying marks are sufficiently in focus, whether a stack of media is full or nearly empty.

14. A method of identifying a type of recording medium, including a pattern of identifying marks, comprising the steps of:

providing a movable tray assembly including reference marks disposed at a predetermined spacing for measuring distance traveled by the movable tray;

moving the movable tray assembly;

detecting the reference marks by an optical detector;

detecting the pattern of identifying marks on the recording medium;

processing signals to provide an output corresponding to the reference marks and identifying marks; and comparing output of the processed signals to a look-up table including signal output patterns corresponding to a plurality of media types in order to identify the type of recording medium.

15. The method claimed in claim 14, wherein the step of detecting the pattern of identifying marks on the recording medium includes using the same optical detector used in the step of detecting the reference marks on the movable tray.

16. The method claimed in claim 14, wherein the step of moving the movable tray further comprises sending a command for a motor to move the movable tray.

17. The method claimed in claim 14, wherein the step of detecting the pattern of identifying marks on the recording medium further comprises detecting the pattern of identifying marks on recording medium held in the movable tray.

18. The method claimed in claim 14, wherein the step of detecting the pattern of identifying marks on the recording medium further comprises detecting the pattern of identifying marks on recording medium that is held in a stationary tray.

19. The method claimed in claim 14, wherein the identifying marks on the recording media types that are stored in the look-up table are repeated at a repeat distance D on the recording media, and wherein the step of moving the movable tray further comprises moving the movable tray by a distance of at least 2D.

20. The method claimed in claim 14, wherein the step of processing signals includes determining an amount of reference marks passing through a field of view of the optical detector.

* * * * *